(12) United States Patent
Weigand et al.

(10) Patent No.: US 7,758,065 B2
(45) Date of Patent: Jul. 20, 2010

(54) AIRBAG MODULE

(75) Inventors: Steffan Weigand, Aschaffenburg (DE); Frank Sauer, Niedernberg (DE); Stefan Hamels, Aschaffenburg (DE); Ralf Glaab, Krombach (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/230,845

(22) Filed: Sep. 5, 2008

(65) Prior Publication Data

US 2009/0014987 A1    Jan. 15, 2009

Related U.S. Application Data

(63) Continuation of application No. PCT/EP2007/002429, filed on Mar. 14, 2007.

(30) Foreign Application Priority Data

Mar. 22, 2006    (DE)  ................ 10 2006 013 990

(51) Int. Cl.
*B60R 21/20*    (2006.01)

(52) U.S. Cl. .................................. 280/728.2

(58) Field of Classification Search .............. 280/728.2, 280/731

See application file for complete search history.

(56) References Cited

U.S. PATENT DOCUMENTS

| | | | | |
|---|---|---|---|---|
| 4,995,638 A * | 2/1991 | Shinto et al. | ................. | 280/731 |
| 5,409,256 A * | 4/1995 | Gordon et al. | ........... | 280/728.2 |
| 5,431,432 A * | 7/1995 | Webber et al. | ........... | 280/728.2 |
| 5,658,008 A | 8/1997 | Herrmann et al. | | |
| 5,709,401 A | 1/1998 | Schenck | | |
| 5,765,865 A * | 6/1998 | Nagata et al. | ................ | 280/731 |
| 6,029,992 A * | 2/2000 | Vendely et al. | .......... | 280/728.2 |
| 6,053,528 A * | 4/2000 | Marx et al. | ............... | 280/728.3 |
| 6,092,834 A | 7/2000 | Staub et al. | | |
| 6,164,684 A | 12/2000 | Lehman | | |
| 6,361,065 B1 * | 3/2002 | Frisch | ..................... | 280/728.2 |
| 6,398,255 B1 * | 6/2002 | Scherzinger et al. | ........ | 280/731 |
| 6,568,702 B1 | 5/2003 | Ford | | |

(Continued)

FOREIGN PATENT DOCUMENTS

DE      44 34 685 A 1      4/1996

(Continued)

OTHER PUBLICATIONS

Examination Report issued in corresponding German application No. 10 2006 013 990.9-56; Nov. 4, 2009; 4 pgs.

*Primary Examiner*—Paul N Dickson
*Assistant Examiner*—Nicole Verley
(74) *Attorney, Agent, or Firm*—Foley & Lardner LLP (57) ABSTRACT

An airbag module including a gas generator with at least one laterally projecting fastening portion; a generator support; an airbag with an inflation opening; a cover cap; and latching elements for connecting the generator support to the cover cap. The airbag has a plate proximate to the inflation opening, the plate including an opening for the gas generator. Latching elements are provided to hold the plate and the airbag connected thereto, and to hold the fastening portion of the gas generator situated between the generator support and the plate. The plate, at least in the region of these latching elements, is larger than the external dimensioning of the folded airbag in the region of the inflation opening.

9 Claims, 9 Drawing Sheets

U.S. PATENT DOCUMENTS

| | | | |
|---|---|---|---|
| 6,592,141 B1 * | 7/2003 | Dancasius et al. | 280/728.2 |
| 6,695,343 B1 * | 2/2004 | Christiansen et al. | 280/731 |
| 6,702,319 B2 * | 3/2004 | Sczeburek et al. | 280/728.3 |
| 6,709,004 B1 * | 3/2004 | Judd et al. | 280/728.2 |
| 6,820,894 B2 * | 11/2004 | Lim et al. | 280/731 |
| 6,942,244 B2 | 9/2005 | Roychoudhury | |
| 7,004,497 B2 * | 2/2006 | Thomas et al. | 280/728.3 |
| 7,007,969 B2 * | 3/2006 | Abe | 280/728.2 |
| 7,144,034 B2 * | 12/2006 | Nash et al. | 280/728.2 |
| 7,290,789 B2 * | 11/2007 | Kreuzer et al. | 280/728.2 |
| 7,384,064 B2 * | 6/2008 | Thomas et al. | 280/731 |
| 7,530,599 B2 * | 5/2009 | Williams et al. | 280/728.2 |
| 2001/0035632 A1 * | 11/2001 | Amamori et al. | 280/728.2 |
| 2002/0140210 A1 * | 10/2002 | Lovell et al. | 280/728.2 |
| 2004/0108690 A1 | 6/2004 | Schutz et al. | |
| 2005/0230938 A1 | 10/2005 | Thomas et al. | |
| 2006/0267320 A1 | 11/2006 | Lube | |
| 2007/0108740 A1 * | 5/2007 | Salmon et al. | 280/728.2 |
| 2007/0267850 A1 * | 11/2007 | Eckert et al. | 280/728.2 |
| 2007/0278772 A1 * | 12/2007 | Burghardt et al. | 280/731 |
| 2008/0258446 A1 | 10/2008 | Eckert et al. | |

FOREIGN PATENT DOCUMENTS

| | | |
|---|---|---|
| DE | 195 16 255 A 1 | 10/1996 |
| DE | 19646204 | 5/1998 |
| DE | 198 04 579 A 1 | 8/1999 |
| DE | 199 43 368 A 1 | 3/2001 |
| DE | 202 18 740 U1 | 5/2003 |
| DE | 20 2004 002 692 U1 | 5/2004 |
| DE | 103 61 887 A 1 | 7/2005 |
| DE | 20 2005 010 864 U1 | 10/2005 |
| DE | 600 25 523 T2 | 9/2006 |
| EP | 0 865 974 A1 | 9/1998 |
| EP | 1 506 896 A1 | 2/2005 |
| EP | 1 252 047 B1 | 1/2006 |
| WO | WO 00/06425 | 2/2000 |

* cited by examiner

AIRBAG MODULE

CROSS REFERENCE TO RELATED APPLICATIONS

This application is a Continuation of International Application PCT/EP2007/002429, filed Mar. 14, 2007, which was published in German on Sep. 27, 2007 as WO 2007/107325 A1. The foregoing International Application is incorporated herein by reference in its entirety.

BACKGROUND

The present application relates to a fastening arrangement in an airbag module.

It is known to connect the generator support and the cover cap of an airbag module to one another by latch-locking. In these airbag modules, however, the gas generator and the airbag are still fastened by bolts or nuts. This increases the complexity, effort, and cost of assembly.

In order to simplify the fastening of the generator support, airbag and cover cap in the airbag module, it is known from DE 198 04 579 A1 and from U.S. Pat. No. 5,709,401 (incorporated by reference herein) to connect these three components to one another by means of hooks. On a side edge of the cover cap and in the region of the inflation opening of the airbag, slots are present, in which, in the assembly, hooks on the generator support engage. These hooks are bent over to secure the components. Although the three components can be assembled in one operation, the bending over of the hooks constitutes an additional operation.

It would be advantageous to further simplify the fastening of the generator support, airbag and cover cap in the airbag module, in particular in a driver's airbag module.

SUMMARY

One disclosed embodiment relates to a fastening arrangement in an airbag module. The airbag module includes a gas generator with at least one laterally projecting fastening portion; a generator support; an airbag with an inflation opening; a cover cap; and latching elements for connecting the generator support to the cover cap. The airbag has a plate proximate to the inflation opening, the plate including an opening for the gas generator. Latching elements are provided to hold the plate and the airbag connected thereto, and to hold the fastening portion of the gas generator situated between the generator support and the plate. The plate, at least in the region of these latching elements, is larger than the external dimensioning of the folded airbag in the region of the inflation opening.

DETAILED DESCRIPTION

One disclosed embodiment relates to a fastening arrangement in an airbag module. The airbag module includes a gas generator with at least one laterally projecting laterally fastening portion; a generator support; an airbag with an inflation opening; a cover cap; and latching elements for connecting the generator support to the cover cap. The airbag has a plate proximate to the inflation opening, the plate including an opening for the gas generator. Latching elements are provided to hold the plate and the airbag connected thereto, and to hold the fastening portion of the gas generator situated between the generator support and the plate. The plate, at least in the region of these latching elements, is larger than the external dimensioning of the folded airbag in the region of the inflation opening.

The advantage of this arrangement is that not only are the gas generator support and the cover cap connected to one another by a latching connection, but that the airbag and the gas generator are also fastened in the airbag module with this latching connection. After engaging the latching elements, no further work is necessary to secure the components.

A flange of a diffuser can be provided as the plate. Portions of the plate can be provided as positioning webs for fastening of the airbag. The portions of the plate may be partially separate from the plate and being at least partially deformable relative to the latter. The positioning webs can run at least approximately parallel to the plate edge. They can also, however, run at least approximately in the direction of the plate middle. The plate can also be sewn into the airbag.

In one embodiment, the generator support has a side wall on at least two opposite sides. The cover cap has walls corresponding to the side walls of the generator support. The side walls of the generator support and of the cover cap can be slipped one over the other and include latching elements. In a preferred embodiment, circumferential side walls are provided on the cover cap and on the generator support.

In a further embodiment, the side wall(s) of the generator support can be slipped over the side wall(s) of the cover cap, and resilient latching elements are provided on the side wall(s) of the generator support. Corresponding apertures are provided on the side wall(s) of the cover cap.

In one embodiment, webs are provided on the side wall(s) of the cover cap to hold the plate and the airbag connected thereto, and to hold the fastening portion of the gas generator between the generator support and the plate with the latching elements. The webs press upon the plate after the cover cap has been latch-locked to the generator support. The webs and the cover cap are preferably configured in one piece.

In another embodiment, it is provided that latching hooks of the generator support are arranged such that they press upon the plate after the cover cap has been latch-locked to the generator support. In this embodiment, the webs of the previous embodiment can be dispensed with.

The plate can have notches at those places at which the latching hooks of the generator support press upon the plate. The latching hook can thereby be prevented from slipping off when subjected to tensile stress by the airbag. This prevents damage to the film surrounding the folded airbag assembly.

In this embodiment, the cover cap may have hooks which reach under the plate and are preferably configured as hook strips. Between these and the latching hooks, the plate is clamped in place following the assembly.

The side wall(s) may further have at least one pin in the region of the hooks. Corresponding apertures in the generator support receive the hooks. The hooks are thereby additionally fixed.

Figure 1:
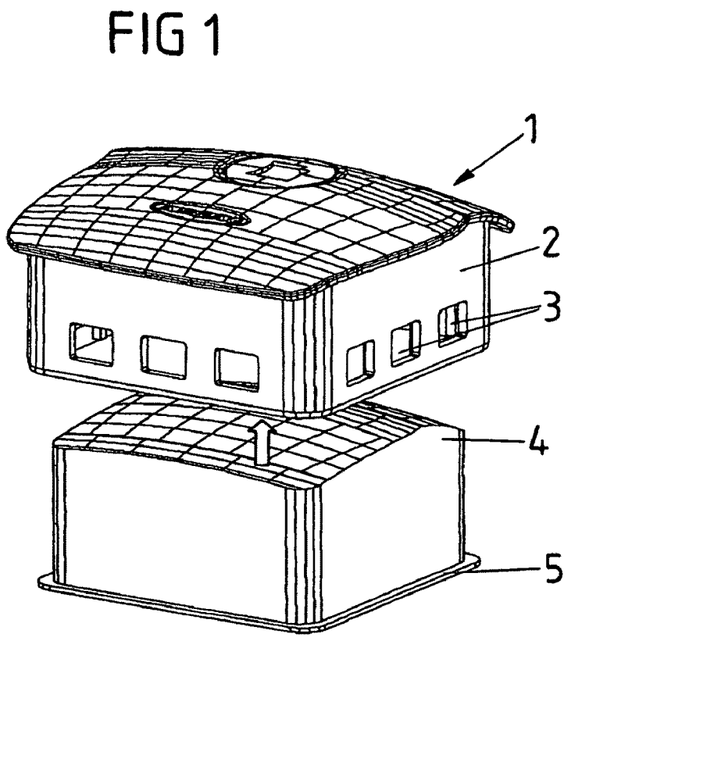
FIG. 1 shows an isometric view of a cover cap and of a folded airbag pack for an airbag module according to an exemplary embodiment.

In FIG. 1, a cover cap 1 having a circumferential side wall 2 is shown according to an exemplary embodiment. Cover cap 1 has apertures 3 for connection to a generator support 6, as will be discussed in greater detail below. FIG. 1 further shows a folded airbag 4 and a plate 5 that is sewn to airbag 4 proximate to the inflation opening (not represented). In this illustrative embodiment, the external dimensioning of plate 5 is larger than the external dimensioning of the folded airbag 4. According to the exemplary embodiment in FIG. 1, the folded airbag 4 has the same external dimensioning over the whole of its height, and therefore, the external dimensioning of plate 5 is larger than the external dimensioning of the folded airbag 4 overall.

Figure 2:
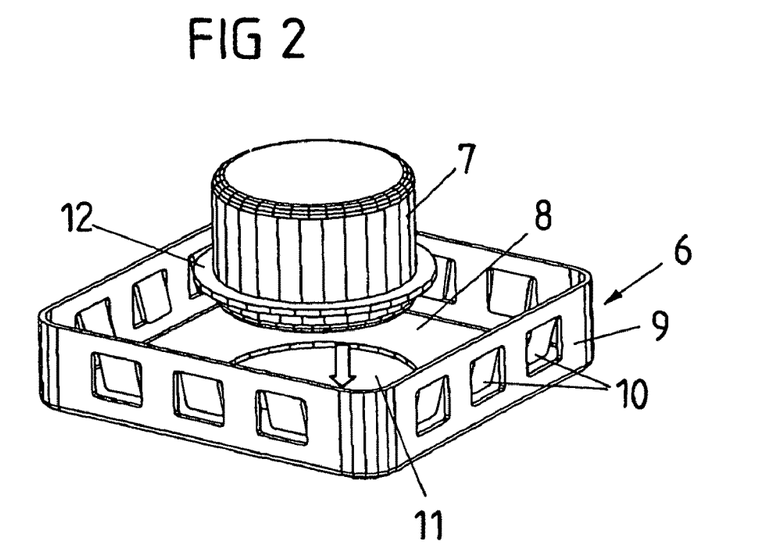
FIG. 2 shows an isometric view of a generator support and of a gas generator for an airbag module according to an exemplary embodiment.

FIG. 2 shows a generator support 6 and a gas generator 7 that are coupled to cover cap 1. Generator support 6 has a base 8 and a circumferential side wall 9 having elastically deformable latching elements 10, that are aligned to apertures 3 in cover cap 1. Circumferential side wall 9 is dimensioned such that it can be slipped over side wall 2. Base 8 forms an aperture 11 for gas generator 7. The lower region of gas generator 7 includes a flange 12 with an external diameter that is greater than the diameter of aperture 11.

Figure 3:
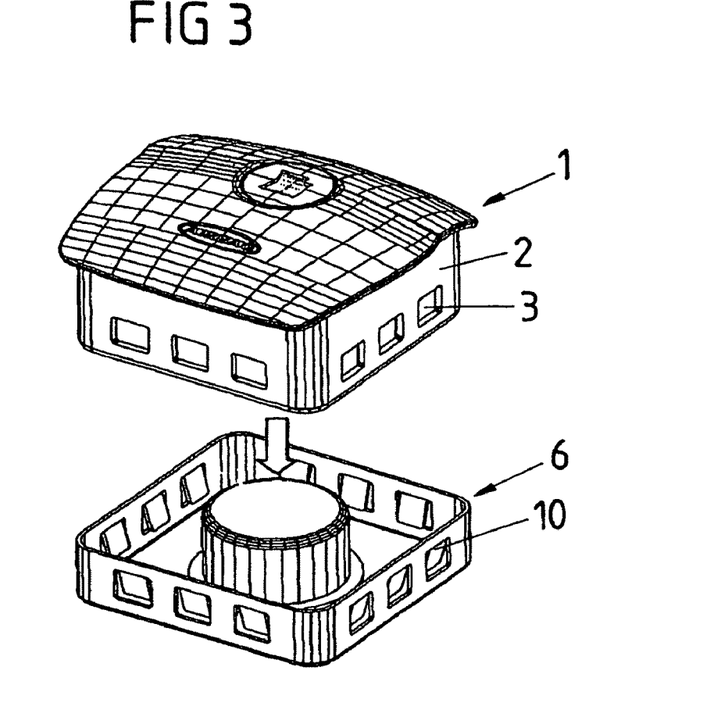
FIGS. 3 and 4 shows the assembly operation for airbag module components of FIGS. 1 and 2.
Figure 4:
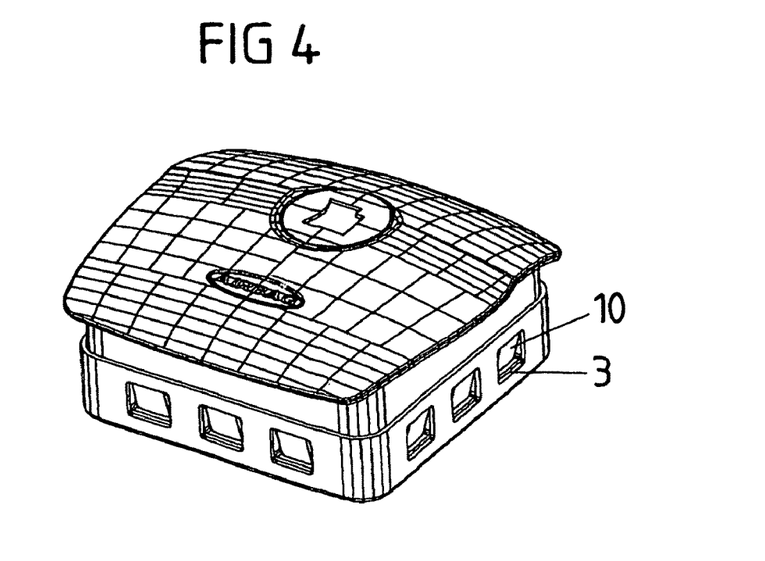

The airbag module is assembled by first inserting the folded airbag 4 into cover cap 1, as is indicated by an arrow in FIG. 1. Gas generator 7 is likewise inserted into generator support 6, as is indicated by an arrow in FIG. 2, until it rests with flange 12 on base 8, shown in FIG. 3. Cover cap 1 is then inserted into generator support 6, indicated by an arrow in FIG. 3. Latching elements 10 of generator support 6 are hereupon forced outward by circumferential side wall 2 of cover cap 1 until, through further pressing of cover cap 1 into generator support, they finally engage in apertures 3, as shown in FIG. 4. Through this simple assembly process, both airbag 4 and gas generator 7 are fixed. The manner in which airbag 4 and gas generator 7 are fixed is explained in more detail below.

Figure 5:
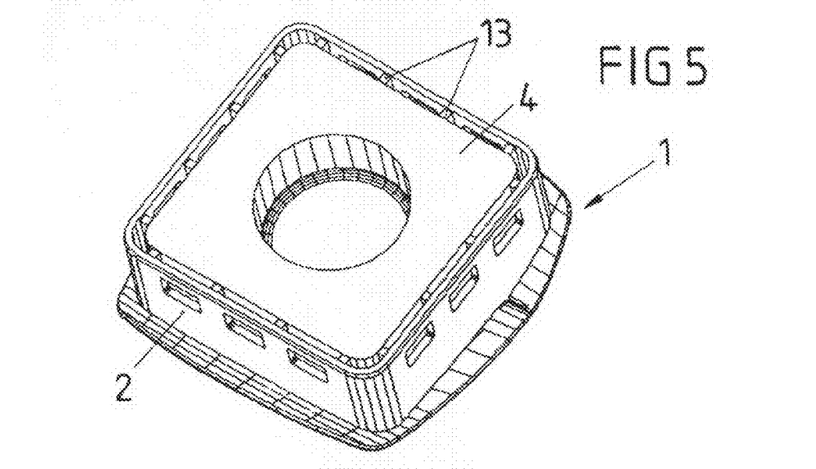
FIG. 5 shows a bottom isometric view of the cover cap and folded airbag pack of FIG. 1 with the bottom plate of the airbag pack removed to show several internal components.
Figure 6:
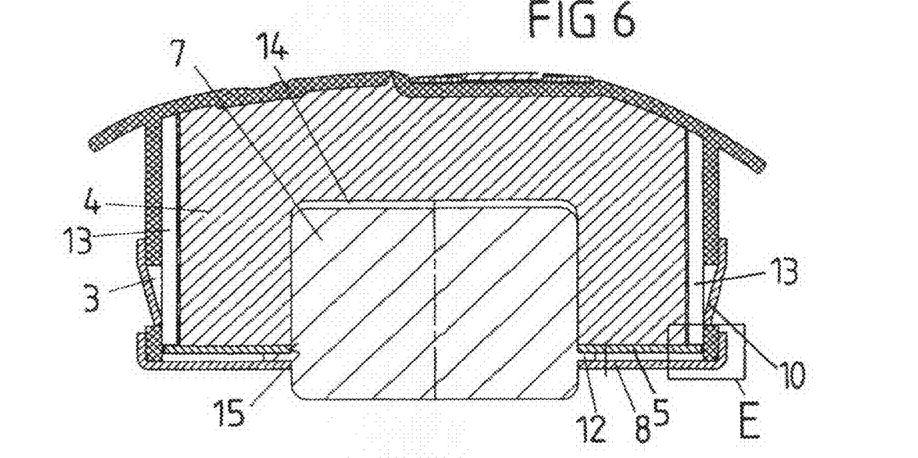
FIG. 6 shows a section view of the assembled airbag arrangement having webs in the cap.
Figure 7:
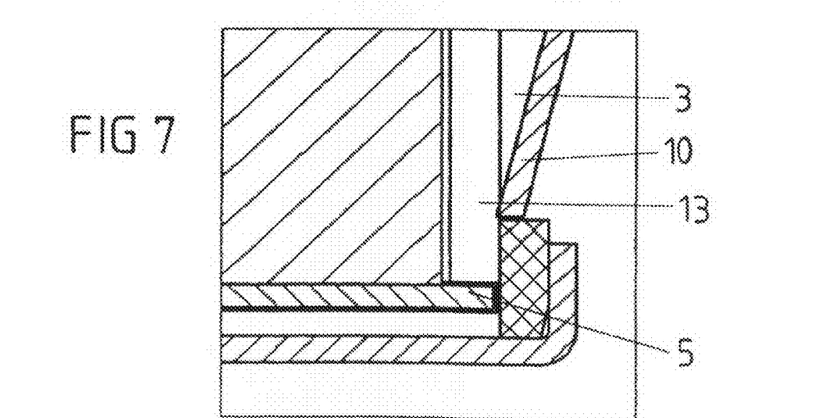
FIG. 7 shows the detail E of FIG. 6.

FIG. 5, shows the airbag assembly with plate 5 removed to show webs 13 present on the inner side of circumferential side wall 2. The mechanism by which webs 13 retain plate 5 can be seen in more detail in FIGS. 6 and 7. Airbag 4 is folded such that it forms a free space 14 for gas generator 7. The middle of plate 5 forms an aperture 15 for gas generator 7. As shown best in FIG. 6, flange 12 of gas generator 7 lies between base 8 of the generator support and plate 5 when the airbag module is assembled. When latching elements 10 engage apertures 3, the webs 13 press onto the outer edge of the plate 5, and flange 12 of gas generator 7 fixes folded airbag 4, which is connected to plate 5, and gas generator 7. As can be seen, multiple components are thereby fixed by a single latching operation.

Figure 8:
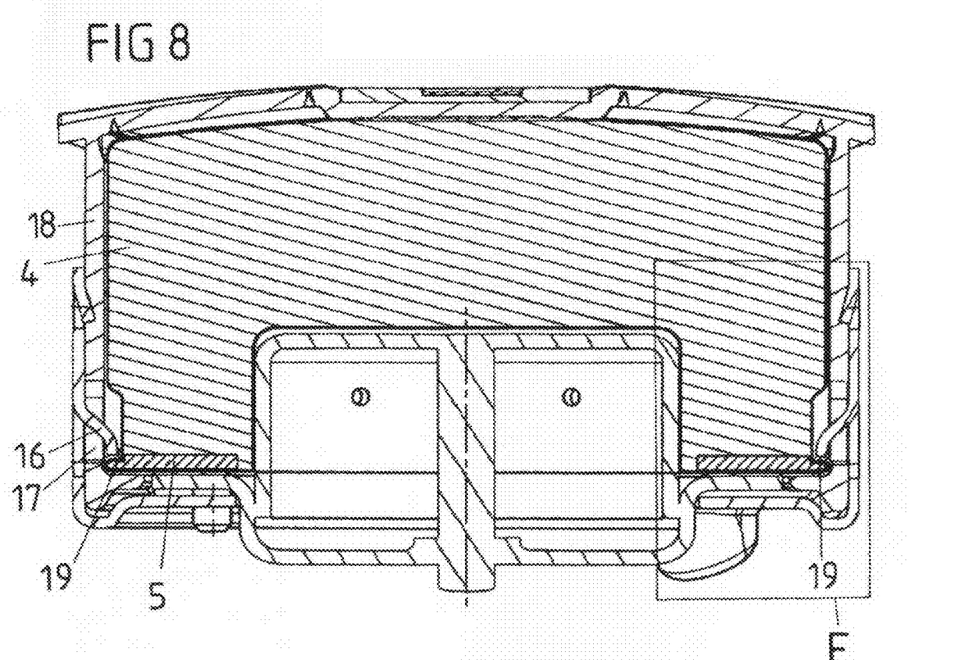
FIG. 8 shows a section view of an assembled airbag arrangement in an embodiment having latching elements as mechanism for holding the plate according to an exemplary embodiment.
Figure 9:
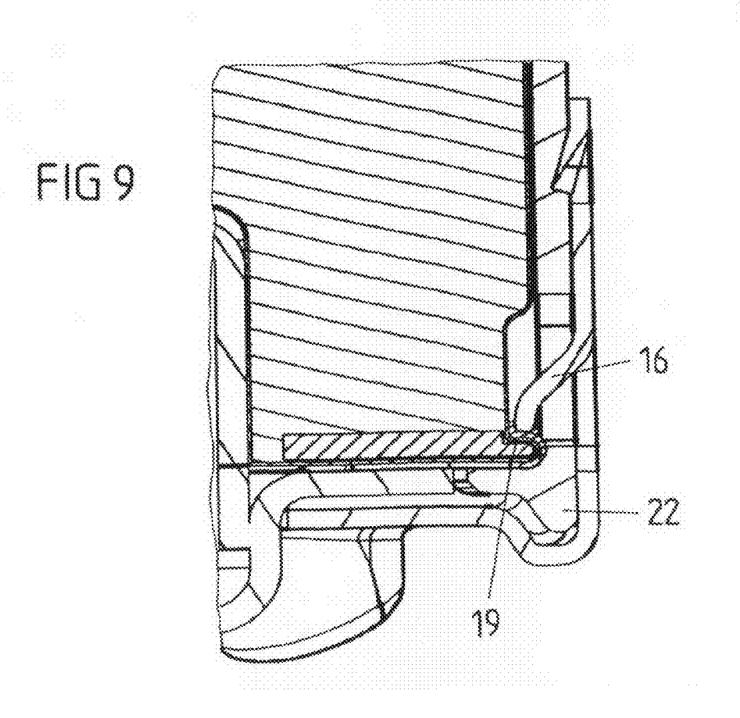
FIG. 9 shows the detail E of FIG. 8.

According to another exemplary embodiment, shown in FIGS. 8 and 9, plate 5 is fixed in place by latching elements 16 that reach through apertures 17 in circumferential side wall 18 of cover cap and press onto plate 5 when the airbag module is assembled. To prevent latching elements 16 from being laterally displaced on plate 5 (e.g., when subjected to tensile stress by airbag 4) latching elements 16 engage notches 19 that are provided on the edge of the plate 5. Unlike the embodiment of folded airbag 4 shown in FIGS. 1-7 and described above, that has a relatively constant external dimension (e.g., diameter, width, etc.) along its height, folded airbag 4 shown in FIGS. 8 and 9 has an external dimension along the majority of its height that is generally equal to the external dimension of plate 5, and a recessed region with a small external dimension proximate to plate 5. The recessed region provides a clearance for latching elements 16. This embodiment represents a further simplification because it does not include the webs shown in FIGS. 1-7

Figure 10:
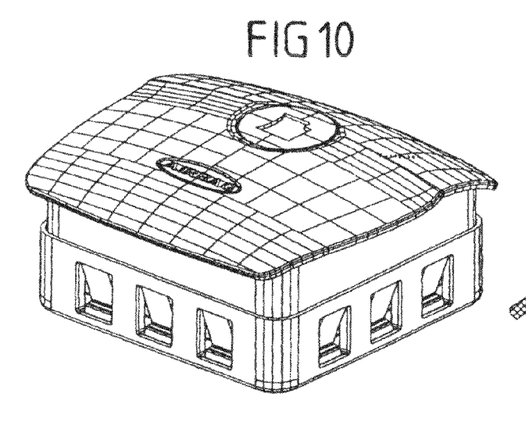
FIG. 10 shows an isometric view of a further embodiment having latching elements as mechanism for holding the plate according to an exemplary embodiment.
Figure 11:
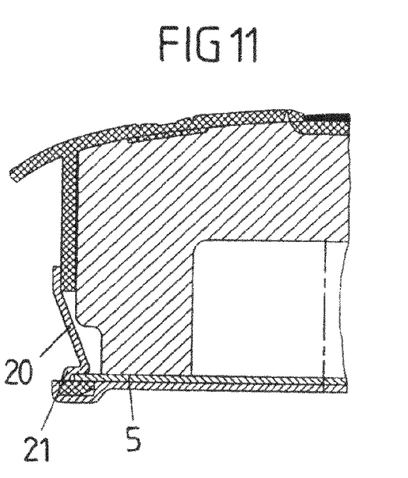
FIG. 11 shows a section view of a portion of the embodiment of FIG. 10.

According to another exemplary embodiment, shown in FIGS. 10 and 11, latching elements 20 are provided. Latching elements 20 are angled outward at the end proximate to plate 5. An angled-off portion 21 rests on the edge of plate 5 and, following the assembly, presses onto plate 5. By contacting the edge of plate 5 and preventing the end of latching elements 20 from contacting airbag 4, angled-off portions 21 reduces the possibility of damage during assembly to the film of an airbag which has been folded under vacuum.

Figure 12:
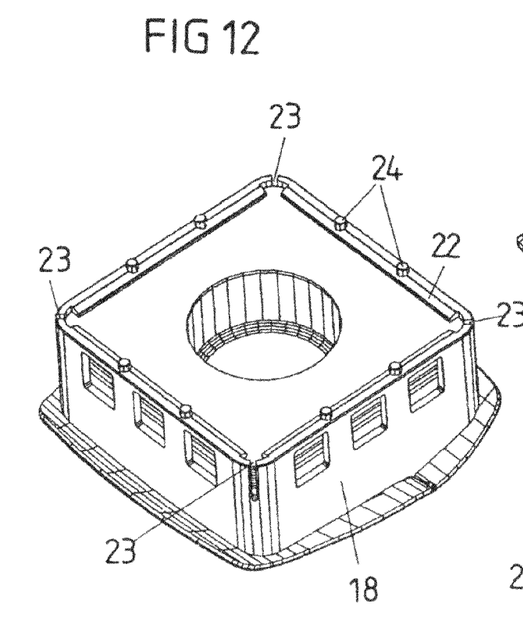
FIG. 12 shows an isometric view of an embodiment in which the cover cap has hooks to fasten it to the generator support according to an exemplary embodiment.
Figure 13:
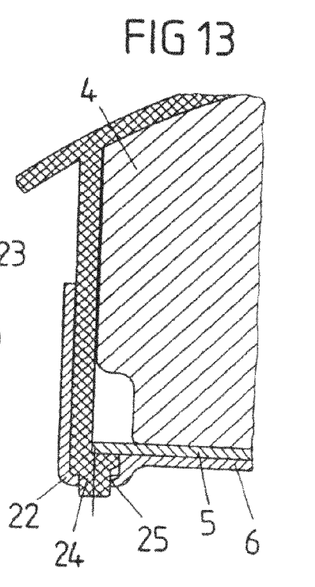
FIG. 13 shows a section view of a portion of the embodiment of FIG. 12.

FIGS. 12 and 13 show several features on the bottom of an airbag module of FIGS. 8-11 that connected cover cap 1 to generator support 6. Cover cap 1 has retaining features at its lower end such as hook strips 22. The circumferential side wall 18 has slots 23 at its corners so that it can be elastically deformed (e.g. bent to the side) when folded airbag 4 and plate 5 are coupled to cover cap 1. When the airbag module is assembled, hooks 22 engage the bottom face of plate 5. To further couple hooks 22 to generator support 6, hooks 22 have pins 24 that reach through corresponding apertures 25 in generator support 6.

Figure 14:
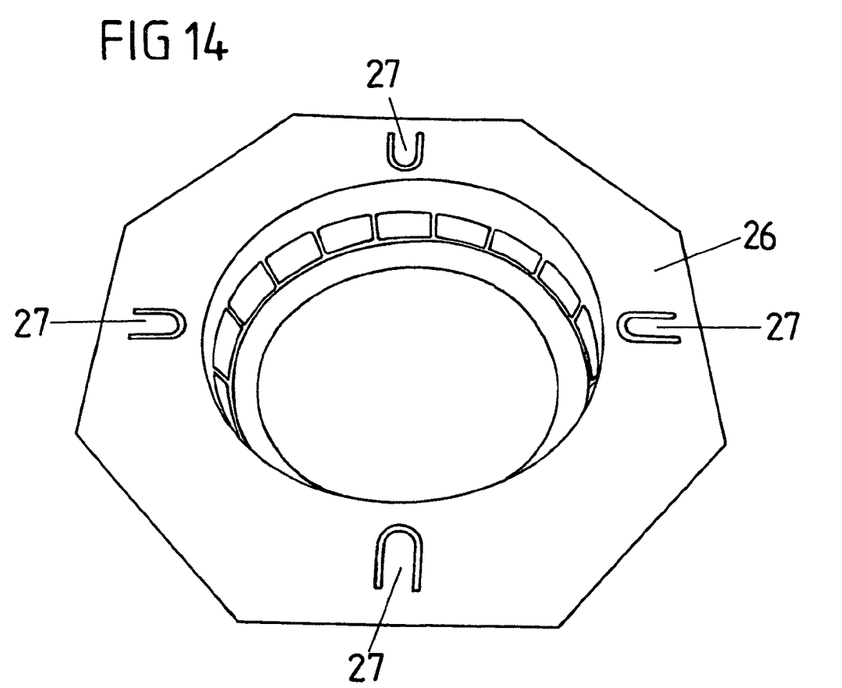
FIG. 14 shows a bottom perspective view of a diffuser with a flange forming the plate and including positioning webs arranged according to one exemplary embodiment.
Figure 15:
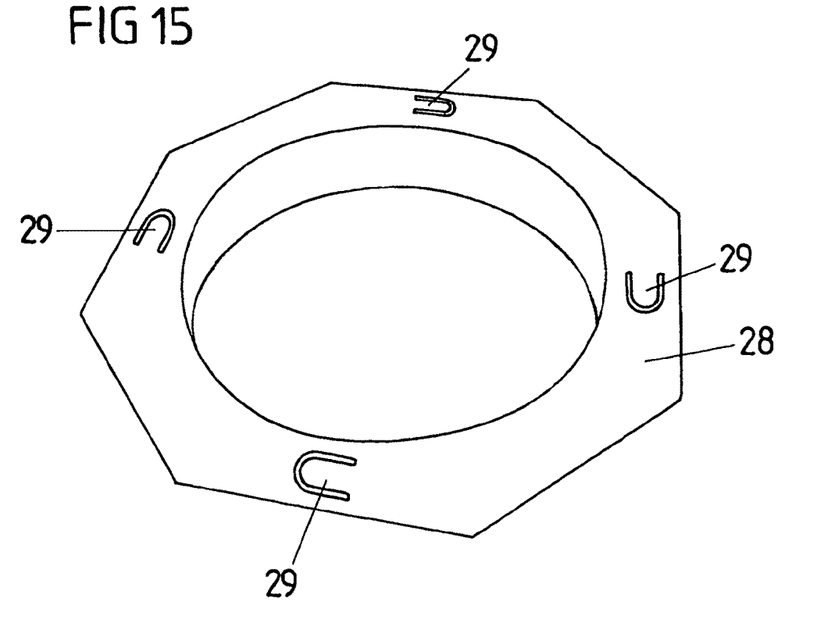
FIG. 15 shows a bottom perspective view of a diffuser with a flange forming the plate and including positioning webs arranged according to another exemplary embodiment.

In FIGS. 14 and 15, the bottom side of a diffuser 32 is represented. Diffuser has a flange 26 that may be similar to plate 5 and includes positioning webs 27. According to one exemplary embodiment, shown in FIG. 14, positioning webs 27 are arranged radially such that they are oriented facing the middle of diffuser 32 and flange 26. In the embodiment of FIG. 15, positioning webs 29 are arranged perpendicular to a radius from the middle of diffuser 32 and flange 26 (e.g. generally aligned with the outside edge of flange 28).

Figure 16:
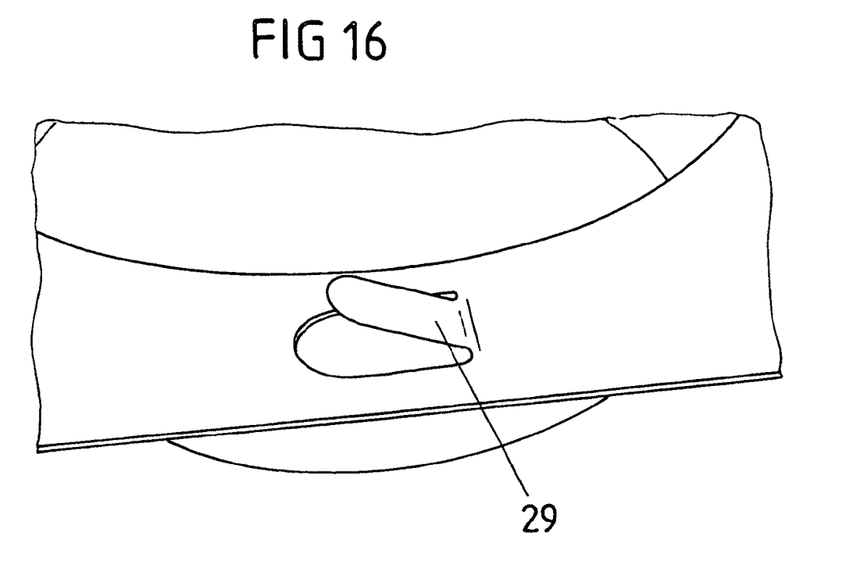
FIG. 16 shows a detail from the plate edge according to FIG. 15, with a bent-up positioning web.
Figure 17:
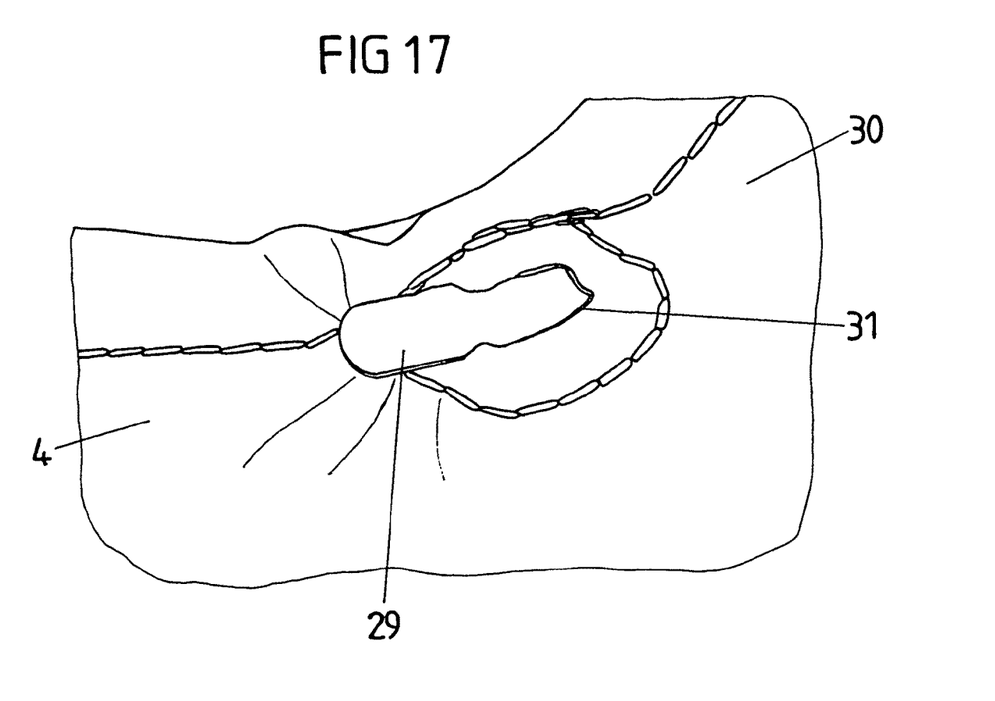
FIG. 17 shows the detail according to FIG. 16 with fitted airbag.
Figure 18:
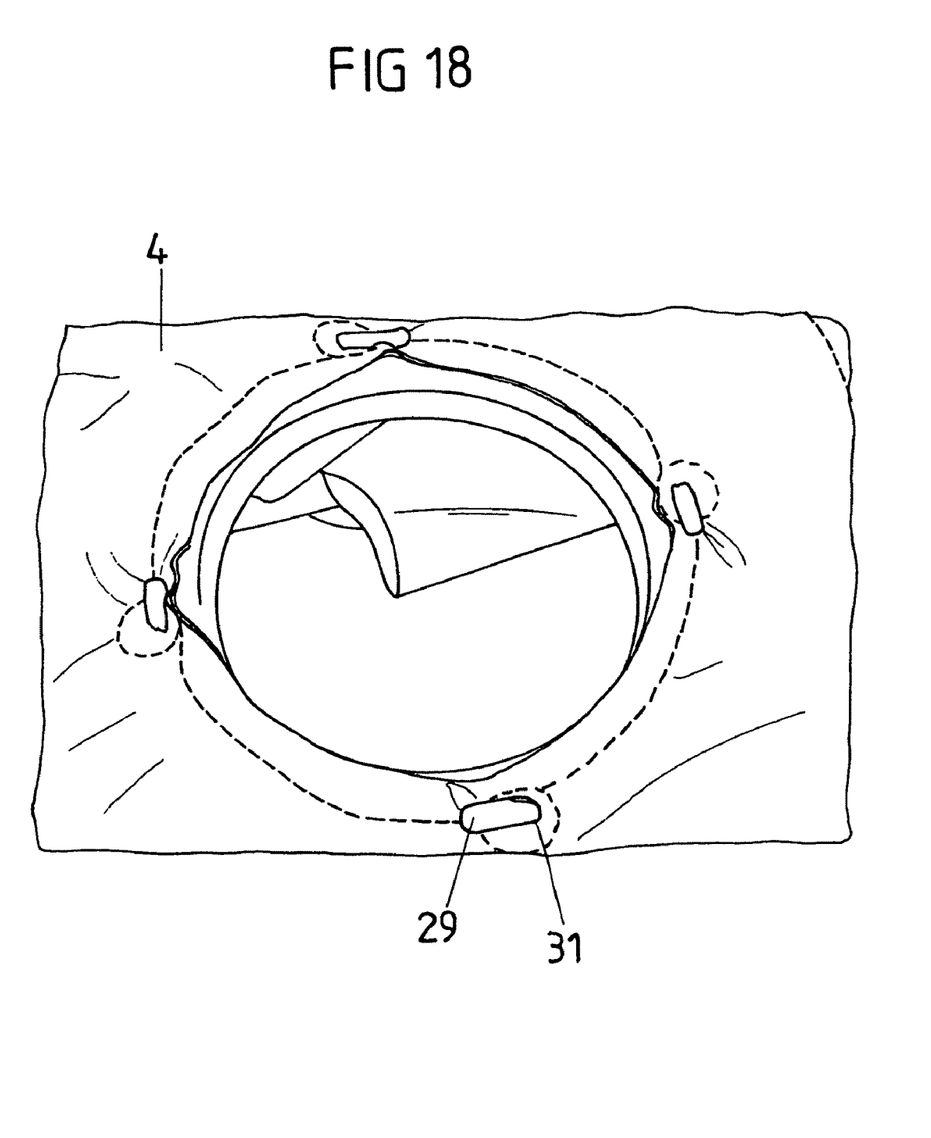
FIG. 18 shows the bottom side of the diffuser according to FIG. 15 with fitted airbag.

Positioning webs 29 are bent up prior to the assembly of the airbag, as is represented in FIG. 16. Airbag 4 is shown coupled to diffuser 32. As shown in FIG. 17, airbag 4 has apertures 31 provided proximate to the inflation opening. While bent up as shown in FIG. 16, positioning webs 29 are inserted into apertures 31 to position airbag 4 relative to diffuser 32. Positioning webs 29 are then bent down into the position shown in FIGS. 15 and 18 to at least partially fix airbag 4 to diffuser 32.

Figure 19:
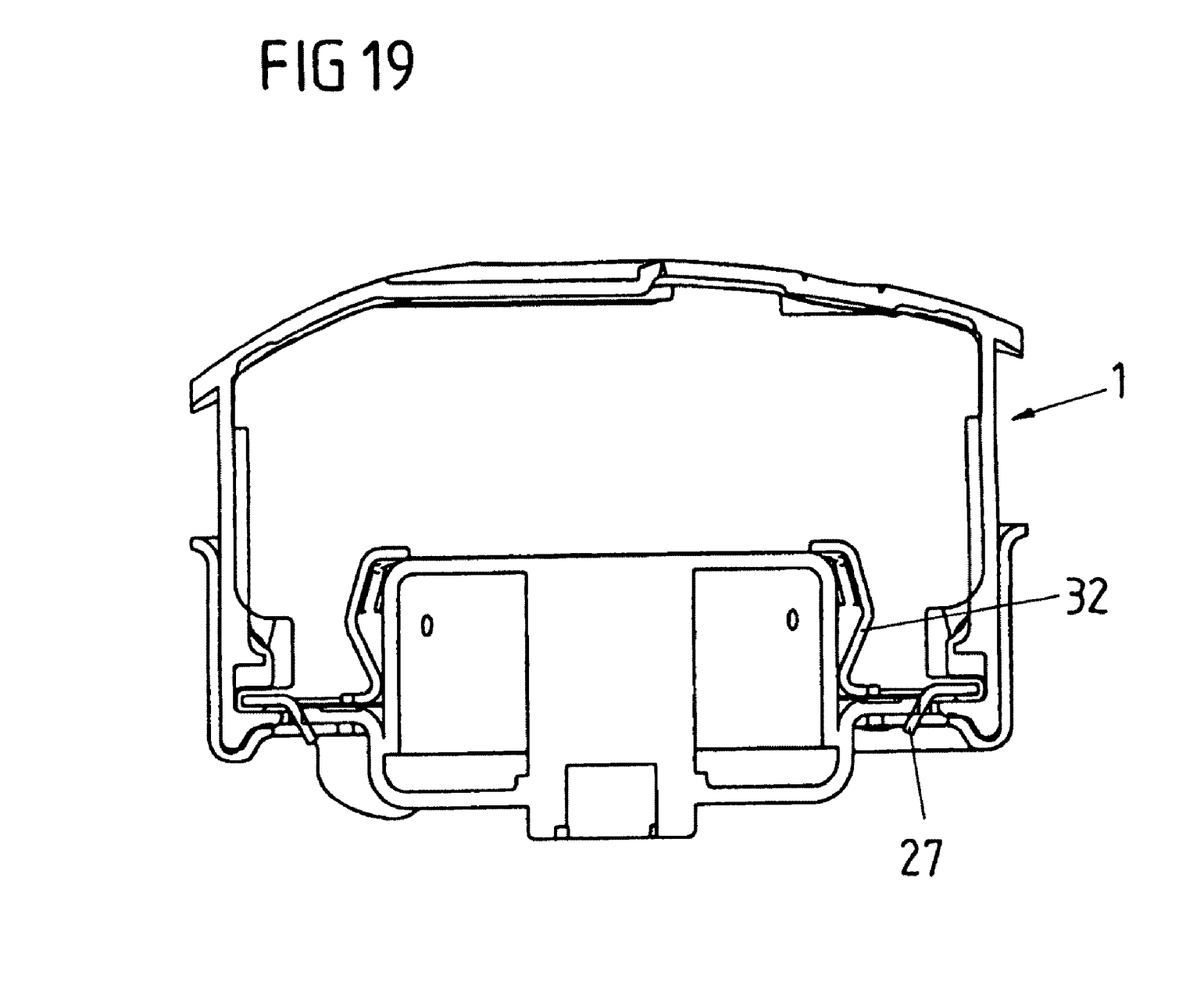
FIG. 19 shows a section through an airbag module having a diffuser according to FIGS. 14-18.

As shown according to one exemplary embodiment in FIG. 19, diffuser 32 is provided in an airbag module between the gas generator and the airbag (not shown for clarity). FIG. 19 shows the airbag module without the airbag, and positioning webs 27 are shown bent up.

The priority application, German Patent Application DE 10 2006013990.9, filed Mar. 22, 2006 including the specification, drawings, claims and abstract, is incorporated herein by reference in its entirety.

It is also important to note that the arrangement of the fastening arrangement in an airbag module, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Many modifications are possible without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. An airbag module comprising:
   a gas generator with at least one laterally projecting fastening portion;
   a generator support;
   a folded airbag including an inflation opening;
   a cover cap including a circumferential side wall having apertures; and
   a plurality of latching elements for connecting the generator support to the cover cap,
   wherein the airbag has a plate proximate to the inflation opening, the plate including an opening for the gas generator;
   wherein the latching elements are configured to extend through the apertures in the circumferential side wall of the cover cap, hold the plate and the airbag connected thereto, and to hold the fastening portion of the gas generator situated between the generator support and the plate; and
   wherein the plate, at least in the region of these latching elements, is larger than the external dimension of the folded airbag proximate to the inflation opening.

2. The airbag module of claim 1, wherein, the plate provides a flange of a diffuser.

3. The airbag module of claim 1, wherein the plate is sewn into the airbag.

4. The airbag module of claim 1, wherein the plate has positioning webs for the fastening of the airbag.

5. The airbag module of claim 4, wherein portions of the plate are provided as the positioning webs, the portions being partially separated from the plate and being at least partially deformable relative to the plate.

6. An airbag module comprising:
   a gas generator and a generator support;
   a folded airbag having an inflation opening;
   a cover cap including a circumferential side wall having apertures; and
   a plurality of latching elements for connecting the generator support to the cover cap;
   an airbag retaining plate;
   wherein the latching elements contact the retaining plate to secure a laterally projecting portion of the gas generator between the plate and the generator support and are configured to extend through the apertures in the circumferential side wall of the cover cap; and
   wherein a portion of the airbag is fixed between the plate and the laterally projection portion; and
   wherein the external dimension of the folded airbag is less than the external dimension of the plate, the dimensions being measured in the vicinity of the latching elements.

7. The airbag module of claim 6, wherein the plate is sewn into the airbag.

8. The airbag module of claim 6, wherein the plate includes deformable positioning webs.

9. The airbag module of claim 6, further comprising a diffuser integrally formed with the plate.

* * * * *